US007765394B2

(12) United States Patent
Beelitz et al.

(10) Patent No.: US 7,765,394 B2
(45) Date of Patent: Jul. 27, 2010

(54) SYSTEM AND METHOD FOR RESTORING A MASTER BOOT RECORD IN ASSOCIATION WITH ACCESSING A HIDDEN PARTITION

(75) Inventors: Alan E. Beelitz, Leander, TX (US); Shree A. Dandekar, Round Rock, TX (US); Paul J. Maia, Cedar Park, TX (US); Reva L. Tolliver, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 939 days.

(21) Appl. No.: 11/590,160

(22) Filed: Oct. 31, 2006

(65) Prior Publication Data

US 2008/0155242 A1 Jun. 26, 2008

(51) Int. Cl.
*G06F 9/00* (2006.01)
*G06F 15/177* (2006.01)
*G06F 9/24* (2006.01)
*G06F 13/00* (2006.01)

(52) U.S. Cl. .............................. 713/2; 713/1; 713/100; 711/100

(58) Field of Classification Search .................... 713/1, 713/2, 100; 711/100
See application file for complete search history.

(56) References Cited

U.S. PATENT DOCUMENTS

| 5,944,820 | A | 8/1999 | Beelitz | |
| 6,032,239 | A | 2/2000 | Beelitz | |
| 6,041,395 | A | 3/2000 | Beelitz | |
| 6,279,093 | B1 | 8/2001 | Beelitz | |
| 6,298,427 | B1 | 10/2001 | Beelitz | |
| 6,430,663 | B1 | 8/2002 | Ding | |
| 6,470,434 | B1 | 10/2002 | Beelitz | |
| 6,691,213 | B1 * | 2/2004 | Luu et al. | 711/163 |
| 6,862,681 | B2 | 3/2005 | Cheston et al. | |
| 7,024,549 | B1 * | 4/2006 | Luu et al. | 713/2 |
| 2002/0162444 | A1 * | 11/2002 | Yu et al. | 84/601 |
| 2003/0182546 | A1 * | 9/2003 | Suzuki et al. | 713/1 |
| 2004/0083405 | A1 | 4/2004 | Chang et al. | |
| 2005/0027978 | A1 | 2/2005 | Neuman et al. | |
| 2005/0246486 | A1 * | 11/2005 | Chiu et al. | 711/112 |
| 2005/0283828 | A1 * | 12/2005 | Perley et al. | 726/4 |
| 2007/0174545 | A1 | 7/2007 | Okada et al. | |
| 2007/0219919 | A1 | 9/2007 | Dandekar et al. | |

* cited by examiner

Primary Examiner—Ji H Bae
(74) Attorney, Agent, or Firm—Larson Newman & Abel, LLP

(57) ABSTRACT

A system and method for restoring a master boot record in association with accessing a hidden partition is disclosed. According to one aspect, a method of restoring a master boot record for a storage device is disclosed. The method can include initiating access to a hidden partition stored within a storage device. The method can also include disassociating a visible partition descriptor from a visible partition of the storage device. The method can also include associating the visible partition descriptor with the hidden partition and accessing the hidden partition using the visible partition descriptor. The method can also include reassociating the visible partition descriptor with the visible partition while accessing the hidden partition.

18 Claims, 3 Drawing Sheets

SYSTEM AND METHOD FOR RESTORING A MASTER BOOT RECORD IN ASSOCIATION WITH ACCESSING A HIDDEN PARTITION

FIELD OF THE DISCLOSURE

This disclosure relates generally to information handling systems, and more particularly to a system and method for restoring a master boot record in association with accessing a hidden partition.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Initialization of conventional information handling systems can begin with accessing a system's basic input output system (BIOS) using the microprocessor of the information handling system. When the BIOS boots up the system, the BIOS typically first determines the functionality of critical hardware components and then loads all or a portion of the operating system from a system hard disk drive, diskette drive, or optical drive. The BIOS enables an operating system and various other applications to not have to understand exact details (such as hardware addresses) about various electronic components within an information handling system. For example, an operating system can not have to keep track of addressing for devices such as hard disk drives, video adapters, keyboards, pointing devices, printers, and other devices. As such, altering or changing an input/output device typically does not require an application or operating system to be modified in order to operate as an information handling system's BIOS typically handles this function.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
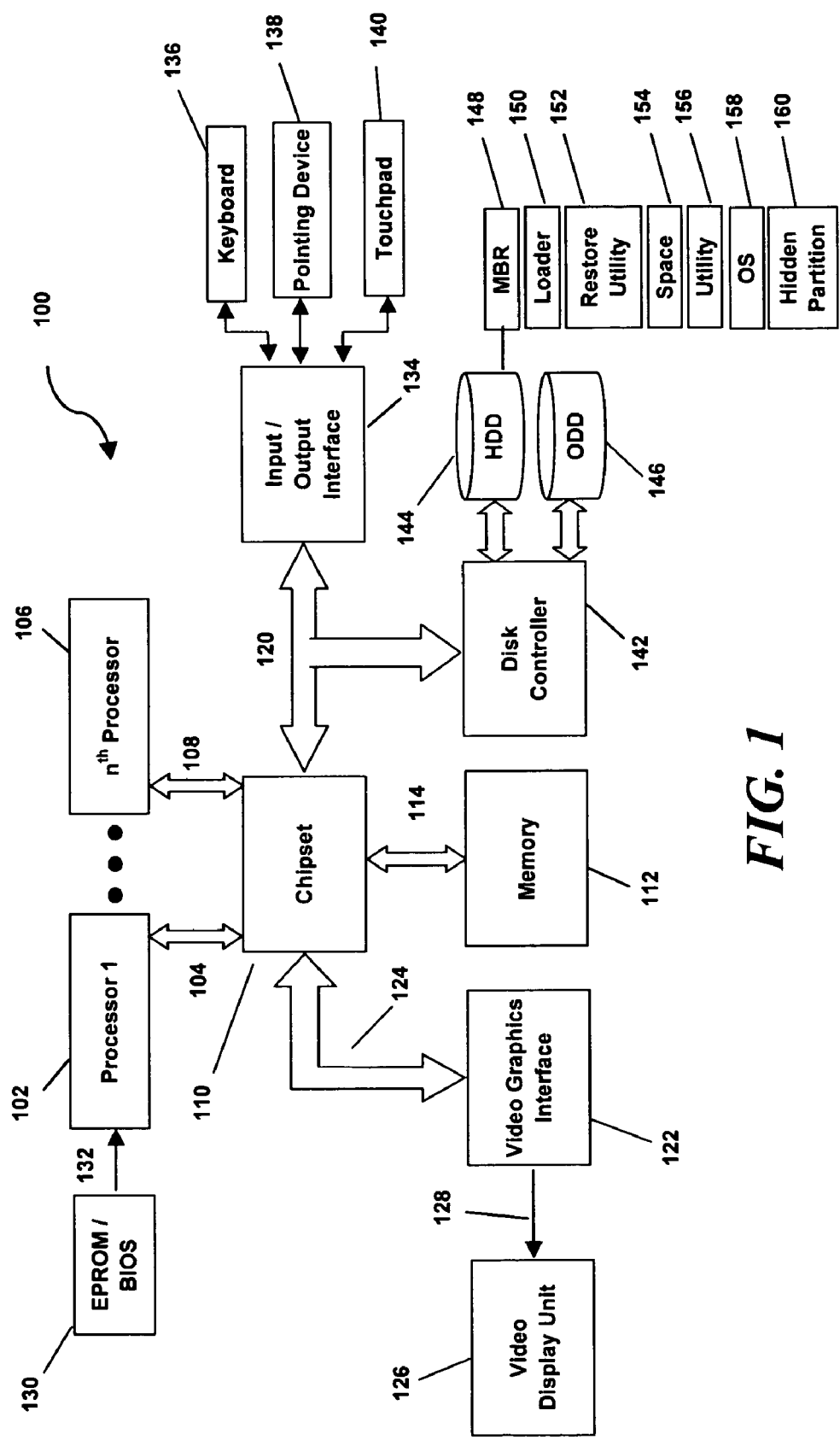
FIG. 1 illustrates a block diagram of a information handling system according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As indicated above, the following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. For example, much of the following focuses on information handling systems having printed circuit boards with quality verification test structures and methods for testing test structures. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

According to one aspect of the disclosure, an information handling system can include a storage device including a visible partition operably associated with an operating system and a hidden partition including contents accessible external to the operating system. The information handling system can further include a processor operable to initiate access to the hidden partition using a visible partition descriptor of the visible partition. The information handling system can also include a restore utility associated with the hidden partition and operable to be initiated upon providing access to the hidden partition during a boot sequence.

According to another aspect, a method of restoring a master boot record for a storage device is disclosed. The method can include initiating access to a hidden partition stored within a storage device. The method can also include disassociating a visible partition descriptor from a visible partition of the storage device. The method can further include associating the visible partition descriptor with the hidden partition and accessing the hidden partition using the visible partition descriptor. The method can also include associating the visible partition descriptor with the visible partition while accessing the hidden partition.

According to a further aspect, a method of restoring a master boot record of a storage device is provided. The method can include initiating access to a hidden partition of a storage device and detecting whether a visible partition of the storage device is available. The method can also include accessing a master boot record of the storage device to determine a descriptor for the available visible partition and storing a copy of the descriptor. The method can further include disassociating the descriptor for the available visible partition from the available visible partition within the master boot record and associating the descriptor with the hidden partition of the storage device. The method can further include initiating access to the hidden partition using the descriptor and verifying access to the hidden partition. The method can also include accessing the stored copy of the descriptor. The method can further include modifying the master boot record to reassociate the stored copy of the descriptor with the available visible partition while accessing the hidden partition.

FIG. 1 illustrates a block diagram of an exemplary embodiment of an information handling system, generally designated at 100. In one form, the information handling system 100 can be a computer system such as a desktop computer, a laptop computer, or other computer system. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can be operable to support multiple processors and processor operations. The chipset 110 can allow for simultaneous processing of multiple processors and support the exchange of information within information handling system 100 during such operations.

According to one aspect, the chipset 110 can be referred to as a memory hub or a memory controller. For example, the chipset 110 the can include an Accelerated Hub Architecture (AHA) that uses a dedicated bus to transfer data between first physical processor 102 and the $n^{th}$ physical processor 106. For example, the chipset 110 including an AHA enabled-chipset and can include a memory controller hub and an input/output (I/O) controller hub. As a memory controller hub, the chipset 110 can function to provide access to the first physical processor 102 using the first bus 104 and $n^{th}$ physical processor 106 using the second host bus 108. The chipset 110 can also provide a memory interface for accessing a memory 112 using a third host bus 114. In a particular embodiment, the host buses 104, 108, and 114 can be individual buses or part of the same bus. The chipset 110 can also provide bus control and can handle transfers between the host buses 104, 108, 114.

According to one aspect, the chipset 110 can be provided as application specific chipset that provides connectivity to various buses, and integrates other system functions such as a memory interface. For example, the chipset 110 can be provided using an Intel® Hub Architecture (IHA) chipset that can include two part, a Graphics and AGP Memory Controller Hub (GMCH) and the I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

Information handling system 100 can include a video graphics interface 122 that can be coupled to the chipset 110 using a fourth host bus 124. In one form, a video graphics interface 122 can be provided as an Accelerated Graphics Port (AGP) interface to display content within a video display unit 126 using a video output 128. The video display unit 126 can include one or more types of video displays and in one form include a flat panel display (FPD) such as a liquid crystal display or other form of video display unit.

The information handling system 100 can further include a basic input output system (BIOS) stored within an electrically programmable read-only memory (EPROM) device 130 that can be accessed by the first physical processor 102 during initialization, reset, rebooting, or powering up of information handling system 100. The BIOS can be provided using a BIOS input 132 to the first physical processor 102 during initialization, reboot, or start-up of the information handling system 100. In one embodiment, the $n^{th}$ processor 106 can access the BIOS within EPROM 130 when needed or desired.

The information handling system 100 can also include an input/output (I/O) interface 134 that can be connected via the fourth host bus 120 to the chipset 110. The input/output interface 134 can use industry standard buses or proprietary buses that have respective interfaces or bus controllers (not illustrated). The I/O interface 134 can be coupled to several types of input and output devices such as a keyboard 136, a pointing device 138, a touch pad 140, or other types of I/O devices.

In an alternate embodiment, the chipset 110 can be provided as a chipset employing a Northbridge/Southbridge configuration (not illustrated). For example, a Northbridge portion of the chipset 110 can communicate with the first physical processor 102 and can control interaction with the memory 112, the fourth bus 120 operable as a PCI bus, and activities for the video graphics interface 122. The Northbridge portion can also communicate with the first physical processor 102 using first bus 104 and the second bus 108 coupled to the $n^{th}$ physical processor 106. The chipset 110 provided as a Northbridge/Southbridge configuration can also include a Southbridge portion of the chipset 110 and can handle I/O functions of the chipset 110. The Southbridge portion can manage the basic forms of I/O such as Universal Serial Bus (USB), serial I/O, audio outputs, Integrated Drive Electronics (IDE), and Industry Standard Architecture (ISA) I/O for the information handling system 100.

According to a further aspect, the information handling system can include the fourth host bus 120 that can include a Peripheral Component Interconnect (PCI) bus or a high speed PCI-Express bus. For example, PCI and PCI-Express buses can include industry standard buses that can provide interconnect to, and establish communication between, various PCI-enabled hardware devices or components. Other buses can also be provided in association with, or independent of, the fourth host bus 120 including other industry standard buses or proprietary buses, e.g., ISA, SCSI, I2C, SPI, USB buses. The information handling system 100 can further include a disk controller 142 coupled to the fourth bus 120. The disk controller 142 can be used to connect one or more digital media storage devices such as a hard disk drive (HDD) 144 an optical disk drive (ODD) 146 such as a R/W-CD, R/W-DVD, R/W mini-DVD, or other type of optical disk drive.

According to one aspect, the HDD 144 can include a Master Boot Record (MBR) 148, an application loader 150, a Master Boot Record (MBR) restore utility 152, and disk storage space 154. The HDD 144 can further include visible partitions such as a utility partition 156 and a primary operating system (OS) partition 158. In one embodiment, the HDD 144 can be configured with up to four (4) visible partitions. The HDD 144 can further include at least one hidden partition 160 operable to store an operating system or other applications or data that can be used by the information handling system 100. In one form, the HDD 144 can be used as a primary drive for information handling system 100 and can be used to initialize the information handling system 100. For example, the information handling system 100 can boot a primary operating system for the information handling system 100 using the primary OS partition 158.

Figure 2:
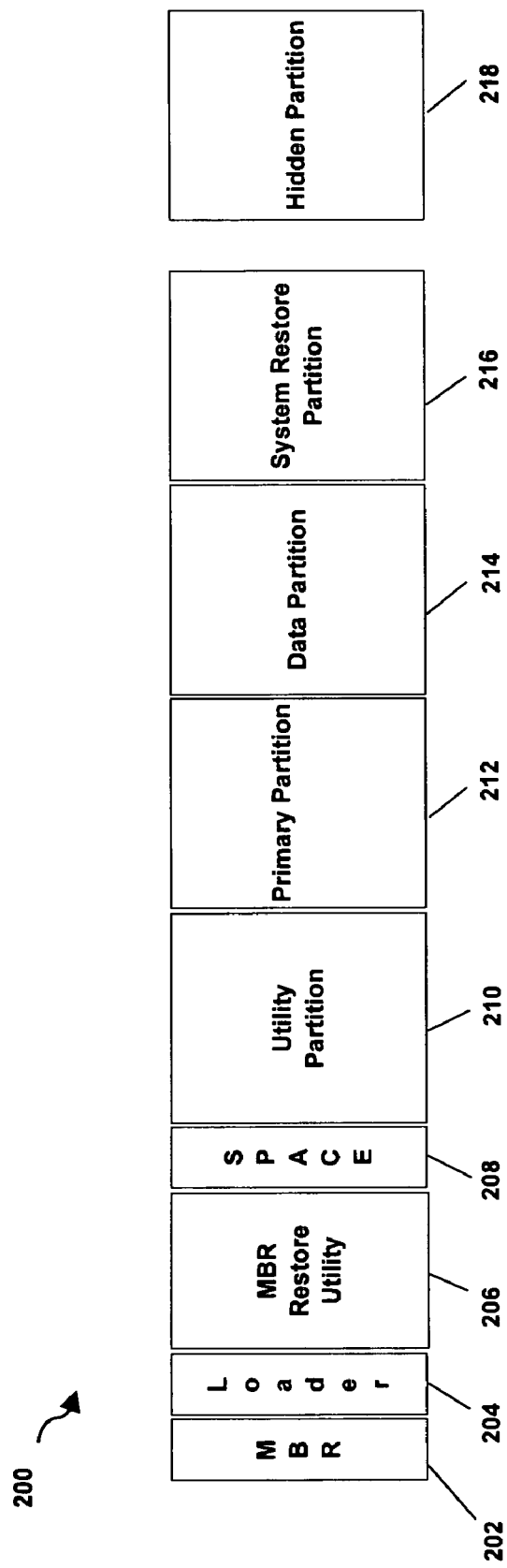
FIG. 2 illustrates a block diagram of a storage device including a hidden partition according to another aspect of the disclosure.

According to one aspect, the BIOS within EPROM 130 can be accessed by the first physical processor 102 during a reboot, power up, initialization, or reset of the information handling system 100. For example, an initialization sequence or boot sequence request can be provided during a reboot or power-up of the information handling system 100. The BIOS within EPROM 130 can be used to manage data flow between the information handling system's 100 attached devices such as HDD 144, ODD 146, keyboard 136, pointing device 138, touch pad 140, video graphics interface 122, and various other devices or components that can be coupled to the information handling system 100. During a reboot or initialization of the information handling system 100, the BIOS can initiate access to the MBR 148 stored within the HDD 144 to determine an operating system to load into the system memory 112. The MBR 148 can be typically stored within a first sector of the HDD 144 and can be accessed when the information handling system 100 uses the HDD 144 to boot from. In one embodiment, the HDD 144 can include a partition table as depicted in FIG. 2. For example, the MBR 148 can include a partition table used to determine how many partitions the HDD 144 may include, and a boot sequence for loading one or more partitions. For example, the HDD 144 can be provided with (4) partitions accessible by the MBR 148 during a boot sequence. The MBR 148 can also provide a location, size, and description of a partition to be used. For example, MBR 148 can provide a description of the partition and the address location with the HDD 144 of the first sector of the partition. In one form, when the information handling system 100 boots a partition, contents of the partition can be copied into system memory 112 and executed using the first physical processor 102 or the n$^{th}$ physical processor 106, or any combination thereof, to provide an operating environment for the information handling system 100.

According to one aspect, the information handling system 100 can access the hidden partition 160 during a boot sequence to load an operating system or application stored within the hidden partition 160. For example, the information handling system 100 can be responsive to one or more inputs provided using the keyboard 136 and in one form, initiate access to an operating system or application stored within the hidden partition 160. For example, a user can request access to a media application stored within the hidden partition 160 and external to an operating system that can be provided by the primary OS 158. Examples of media applications that may be stored within the hidden partition 160 can include MediaDirect by Dell Inc., Instant-On Technology or HP QuickPlay by Hewlett Packard Inc., or various other media applications. For example, MediaDirect can be employed to allow a system to boot up into a dedicated media player by powering up the information handling system 100 using a special MediaDirect button (not illustrated). In this manner, a dedicated media player can be accessible to a user more quickly than in some embodiments where booting into an operating system may be required. Additionally, booting directly to the MediaDirect application using the hidden partition 160 can extend capabilities and safeguards for the information handling system 100 and may be employed within a non-specialized operating environment. In one form, a user can activate a media direct key (not illustrated) using keyboard 136 and the MBR 148. The HDD 144 can be used to obtain access to the hidden partition 160 to load the hidden partition 160 into the system memory 112 and can be executed external to a non-specialized operating environment, such as an operating system environment, that can be provided by a visible partition. In this manner, the hidden partition 160 can remain isolated from an operating system and may not be modified by external resources that can be attempt to access the hidden partition 160 while being used.

According to one aspect, the information handling system 100 can modify the MBR 148 to point to, or be directed to, the hidden partition 160 by associating a visible partition for a visible partition of the HDD 144 with a descriptor of the hidden partition 160. For example, the MBR 148 can be modified to exchange a descriptor of the visible partition with a descriptor of a hidden partition. In this manner, the information handling system 100 can load the hidden partition 160 into the system memory 112 for use by the information handling system 100 using the visible partitions descriptor. As such, during a boot of the information handling system 100, the hidden partition 160 can be accessed and contents of the hidden partition 160 can be loaded into the system memory 112. Additionally, upon accessing the hidden partition 160, the MBR restore utility 152 can be used to return one or more descriptors within the MBR 148 to a previous state. For example, the MBR restore utility 152 can replace or reassociate the descriptor of a visible partition used in association with accessing the hidden partition 160 to the visible partition. For example, in one embodiment the descriptor for the OS partition 158 can be used to access the hidden partition 160. The MBR restore utility 152 can reassociate the descriptor for the OS partition 158 with the OS partition 158 within the MBR 148 upon accessing the hidden partition 160. In this manner, the hidden partition 160 can be accessed by the information handling system 100 and the MBR 148 can be restored to reassociate a visible partition descriptor with a visible partition.

According to another aspect, the information handling system 100 can employ the application loader 150 in association with the MBR restore utility 150 to access the hidden partition 160 and restore the MBR 148 upon providing access to the hidden partition 160. The application loader 150 can exchange or associate a descriptor of a visible partition, such as a descriptor for the primary OS partition 158 or another visible partition of the HDD 144, with the hidden partition 160. The application loader 150 can also disassociate the descriptor for the primary OS partition 158 within the MBR 148. In this manner, a descriptor for the primary OS partition 158 can be associated with the hidden partition 160 and at least a portion of the contents of the hidden partition 160 can be available during initialization.

In one form, access to the hidden partition 160 may be provided and the MBR restore utility 152 can be activated in association with accessing the hidden partition 160. The MBR restore utility 152 may be operable to restore the MBR 148 to a previous state. For example, the MBR restore utility 152 can disassociate or replace the visible partition descriptor used to access the hidden partition 160 and reassociate the visible partition descriptor with the visible partition (i.e. the OS partition 158). In this manner, the MBR restore utility 152 can return the MBR 148 to a previous state without having loaded all of the contents of the hidden partition 160 into the system memory 112. As such, the information handling system 100 can be booted using the hidden partition 160 and the MBR 148 can be restored to a previous state. Additionally, access to the hidden partition 160 can be maintained until the information handling system 100 can be reinitialized or rebooted.

FIG. 2 illustrates a block diagram of a digital storage medium storage device, depicted generally at 200. The storage device 200 can be used in association with an information handling system, such as the information handling system 100 illustrated in FIG. 1. The storage device 200 can include a hard disk drive, an optical disk drive, a magnetic tape drive, a holographic memory device, or other types of memory device that can be operable to provide the storage device 200.

The storage device 200 can include a MBR 202, an application loader 204, a MBR restore utility 206, and disk space 208. The storage device 200 can also include visible partitions that can store information such as operating systems, applications, multi-media content, system restore information, system files, user files, or other types of information or combinations thereof that can be provided or stored within a storage device. In one form, a visible partition can be provided as a logical division of the storage device 200 that can be accessed by an information handling system to load different operating systems, applications, data, content, or other information operable to be stored within the storage device 200. For example, visible partitions can allow a storage device 200 to create an appearance of having separate storage devices for file management, multiple user access, additional operating systems, or other applications. The storage device 200 can be configured to include visible partitions such as a utility partition 210, a primary partition 212, a data partition 214, and a system restore partition 216. The storage device 200 can also be configured to include at least one hidden partition 218 operable to store an operating system, one or more applications, or various other types of information.

In one form, the MBR 202 of the storage device 200 can be provided within a first sector of the storage device 200. For example, the storage device 200 when provided as a hard disk drive or other storage device and can include the MBR 202 accessible to identify the locations (e.g. addresses, size) of one or more operating systems or applications that can be booted or loaded into a memory device of the information handling system and stored within a partition of the storage device 200. According to one aspect, the MBR 202 can be referred to as a "partition sector" or a "master partition table" of the storage device 200. A partition sector can include a table or listing of information that can be used to locate each partition the storage device 200. The MBR 202 can also provide access to the application loader 204 that can be used to read a boot sector record of a specific partition within the storage device 200. For example, the MBR 202 can include an address of a primary operating system stored within the primary partition 212 and can also include an address of a boot sector record of the primary partition 212 that can be used to initiate a boot of the primary partition 212.

In one form, the storage device 200 can include up to four (4) visible partitions including the utility partition 210 that can be accessed prior to a end user license agreement (EULA) that may be accepted or activated, the primary partition 212 that can store a primary OS for an information handling system, the data partition 214 that can store data and other types of files, and the system restore partition 216 that can include an image of an operating system for restoring the primary partition 212 to an installed or initial use state. For example, the system restore partition 216 can be used to reset an information handling system to a factory installed operating state or settings.

In one form, the primary partition 212 can be a visible partition operable to store a primary operating system. For example, the primary partition 212 can include an operating system that can be loaded into a system memory and executed by an information handling system to provide an operating environment for the information handling system. In one form, the primary operating system stored within the primary partition 212 can include an operating system such as a Windows XP® based operating system, a Linux® based operating system, a Sun® based operating system, or any other type of operating system that can be provided within the primary partition 212.

According to one aspect, the data partition 214 can be provided to store data that can be accessed by the operating system. For example, user-specific information, content (e.g. music, video, pictures, etc.), application data, data files, and other data can be stored and accessed by an information handling system. In one form, the system restore partition 216 can include an image file of an operating system and other files that can be provided during an initial software installation for an information handling system. The system restore partition 216 can be accessed by the information handling system to restore the primary partition 212 and other portions of the information handling system in the event of failure, when an operating system or other initially files become corrupt, or during diagnostic testing of an information handling system. Various other situations can also warrant accessing the system restore partition 216 to reload or restore the primary partition 212.

In one form, the hidden partition 218 provided within the storage device 200 can include a secured or protected partition that can be provided using an invisible descriptor. For example, an invisible descriptor can include a descriptor that may not be normally accessed or viewed by a user, primary operating system, or other applications of the information handling system 200. In one form, an invisible descriptor includes a descriptor that may not be normally presented within the MBR 202. For example, the invisible descriptor may be provided outside of the MBR 202 of the storage device 200 and can be used or accessed by an application to reference a hidden partition. In this manner, a hidden partition can be made visible dynamically on an as-desired basis and can remain hidden until desired. In one embodiment, the hidden partition 218 can include a media application, such as MediaDirect, Instant-On Technology, or HP QuickPlay, which can be stored within the hidden partition 218. According to one aspect, a user can interact with an information handling system and one or more events can be detected by the information handling system to initiate access to the hidden partition 218. For example, the information handling system can initiate access to the hidden partition 218 in response to a user activated event or events provided by the information handling system, components, devices, software applications or any combination thereof.

According to one aspect, an event can be detected that initiates a boot sequence to load an operating system or application stored within the hidden partition 218. For example, the information handling system can initiate a boot sequence and can determine an operating status of one of the visible partitions. The storage device 200 can receive a request to access the hidden partition 218 and can determine if the utility partition 210 may be active. If the utility partition 210 is inactive, the MBR 202 can use the application loader 204 to associate the hidden partition 218 to the system restore partition 210. For example, the system restore partition 216 may not be accessed until the utility partition 210 may be inactive. As such, a descriptor for the system restore partition 216 can be used during a current initialization sequence to access the hidden partition 218.

According to one aspect, upon determining the utility partition 210 being active, the program loader 204 can exchange the descriptor of the hidden partition 218 with the descriptor or address of the system restore partition 216. The hidden partition 218 may then be visible and accessed by the information handling system as if the hidden partition 218 were the system restore partition 216 and loaded into system memory of the information handling system during a boot sequence or initialization.

According to another aspect, the MBR restore utility 204 can be employed upon providing access to the hidden partition 218 using a descriptor of the system restore partition 216. For example, the application loader 204 can replace the system restore partition's 216 descriptor within the MBR 202 with the hidden partition's 218 descriptor. In one form, a copy of the system restore partition's 216 descriptor can be saved or copied to the storage space 208 including the application loader 204. For example, the application loader can be stored within "track zero (0)" of the storage device 200 and a copy of the system restore partition's 216 descriptor can be stored within the application loader. In one embodiment, a user may update the MBR 202 to include a new descriptor and the application loader 204 can detect the update and ensure a stored reference may be located within the application loader for restoring as desired. In this manner, a new partition descriptor for the MBR 202 may be provided and updated as desired and the MBR restore utility 206 may use the new partition descriptor. Upon providing access to the hidden partition 218, the MBR restore utility 206 can access the stored copy of the system restore partition's 216 descriptor and update the MBR 202 to reassociate the descriptor for the system restore partition 216 with the stored descriptor. Additionally, access to the hidden partition 218 can also be maintained until the MBR 202 may be accessed during a subsequent initialization or boot of the information handling system. In this manner, the MBR 202 can be used to access the hidden partition 218 and the MBR restore utility 206 can return the MBR 202 to a previous state for subsequent initializations or system boots.

Figure 3:
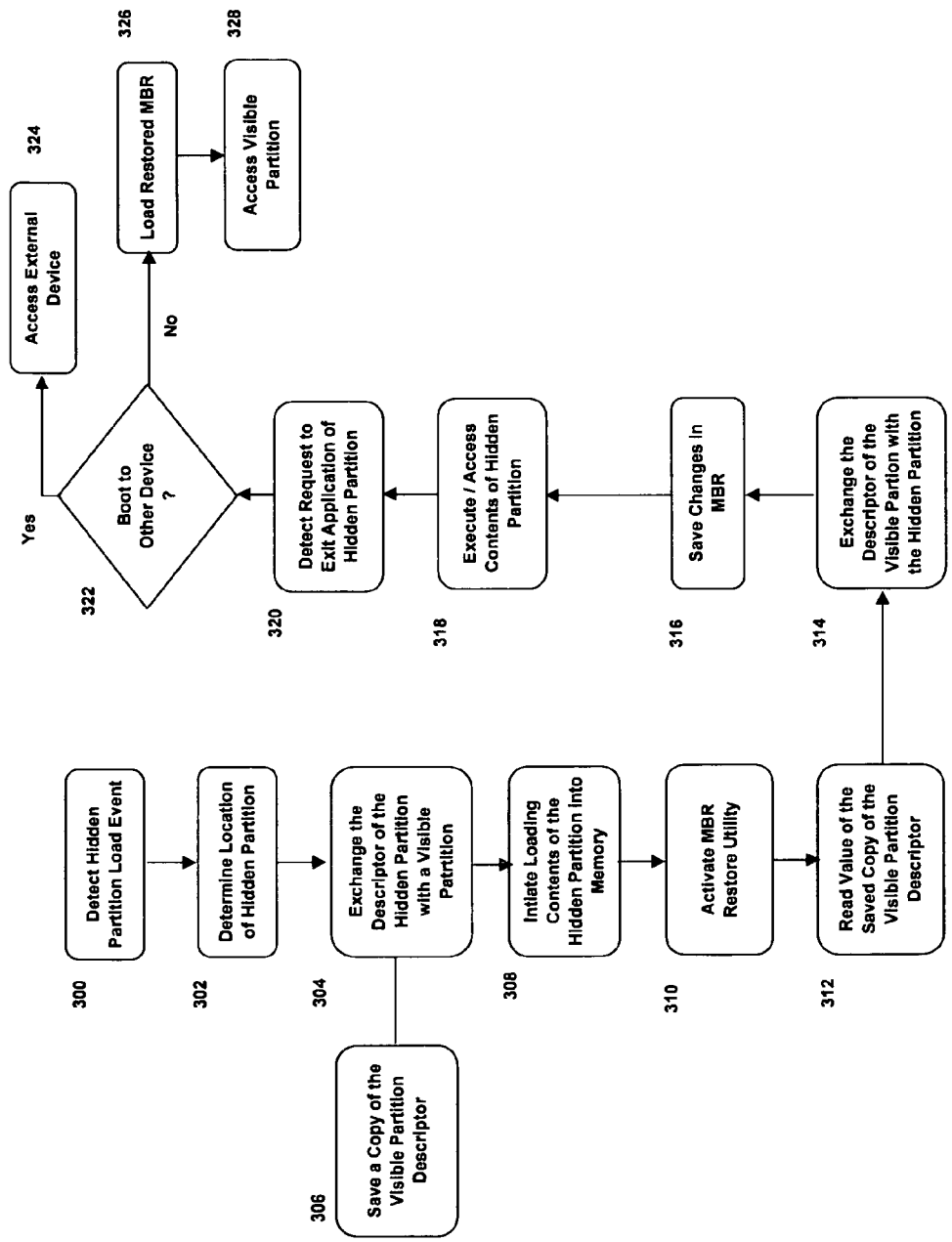
FIG. 3 illustrates a flow diagram of method for restoring a master boot record of a storage device according to one aspect of the disclosure.

FIG. 3 illustrates a flow diagram of method for restoring a boot record of a storage device according to a one aspect of the disclosure. The method can be used by the information handling system 100 illustrated in FIG. 1 or other information handling systems operable to employ the method of FIG. 3. Additionally, the method of FIG. 3 can be stored as encoded logic or software and can be stored or provided within a memory device, an optical storage device, a magnetic storage device, or any other type of storage medium that can be provided in association with at least a portion of the method of FIG. 3.

The method begins generally at 300 when an event may be detected by the information handling system to load or access a hidden partition. For example, a media application or other type of application or operating system may be provided within a hidden partition of a primary hard disk drive. In one form, a MediaDirect button for an information handling system can be can be selected by a user of the information handling system. For example, a MediaDirect button can be used to provide instant or direct access to a multimedia software application for playing videos, music, accessing digital photos, etc.

Upon detecting a hidden partition load or access event, the method proceeds to step 302 and determines a location for the hidden partition. For example, an application loader associated with a MBR of a storage device can be used to determine the location of a hidden partition. The hidden partition can be accessed by associating a known valid descriptor of a visible partition, such as a system restore partition descriptor for a system restore partition such as the system restore partition 216 depicted in FIG. 2, with the hidden partition descriptor for a hidden partition such as the hidden partition 218 depicted in FIG. 2. The method proceeds to step 304 and the MBR can be updated to associate the hidden partition descriptor with a visible partition descriptor. For example, the MBR can include one or more references to one or more visible partitions of the storage device. In one embodiment, a descriptor for a system restore partition can be disassociate with a system restore partition of the storage device by exchanging the system restore partition descriptor with the hidden partition descriptor. In one embodiment, an application loader can be provided in association with a MBR of the primary hard disk drive and can update the MBR to point to the hidden partition using a visible partition descriptor.

Upon exchanging the descriptor of the hidden partition with the descriptor of a visible partition, a copy of the visible partition descriptor can be saved at 306 and accessed to restore the MBR. For example, a copy of the visible partition descriptor can be stored or maintained within an application loader operably association with the MBR. The method then proceeds to step 308 and initiates loading the contents of the hidden partition into memory of the information handling system. For example, a portion or all of the contents of the hidden partition can be loaded into system memory of the information handling system and the information handling system can boot or initialize using the contents of the hidden partition. In one form, the hidden partition contents includes a Media Direct host protected area (HPA). For example, the MediaDirect HPA descriptor can be exchanged with a visible partition descriptor within the MBR. In this manner, the hidden partition that can include the MediaDirect HPA software may be available and can be loaded into a system memory of the information handling system to boot from using the visible partition descriptor.

At step 310, the MBR restore utility can be activated and at step 312, a saved copy of the visible partition descriptor may be accessed and read. For example, a saved copy of the visible partition descriptor may be stored within an application loader associated with the MBR restore utility. The method can then proceed to step 314 and the hidden partition descriptor can be updated within the MBR to reassociate with the visible partition descriptor with the visible partition. For example, the saved copy of the visible partition descriptor may be exchanged with the hidden partition to provide or restore access to the visible partition. Additionally, the descriptor for the hidden partition can be returned to an initial value or descriptor to ensure the hidden partition may not be visible or accessible during a subsequent initialization, boot sequence, or access. The method proceeds at step 316, and changes made to the MBR can be saved. The method then proceeds to step 318 and the information handling system can continue to access the hidden partition and execute an application or operating system of the hidden partition as needed or desired.

At step 320, a request to exit the hidden partition, or application provided by the hidden partition, can be detected. For example, an exit or reboot event can be detected and the method can proceed to decision step 322 and determine if the information handling system should access or boot to an external device such as an optical drive, USB drive, or other bootable drive. If an external device should be used, the method proceeds to step 324 and the information handling system can access the external device. If at decision step 322 the method determines that the information handling system should access a device other than an external device, the method proceeds to step 326 and the restored MBR of the storage device can be accessed and loaded into the system memory for booting the information handling system. The method can then proceed to step 328 and access the visible partition.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a storage device including a visible partition operably associated with an operating system and a hidden partition including contents accessible external to the operating system;
   a processor operable to initiate access to the hidden partition using a visible partition descriptor of the visible partition; and
   a restore utility associated with the hidden partition and operable to be initiated upon providing access to the hidden partition during a boot sequence, and further operable to store a copy of the visible partition descriptor.

2. The system of claim 1, wherein the storage device further comprises a master boot record including the visible partition descriptor.

3. The system of claim 2, wherein the restore utility is further operable to access the stored copy of the visible partition descriptor.

4. The system of claim 3, wherein the restore utility is further operable to restore the master reboot record using the stored copy of the visible partition descriptor upon providing access to the hidden partition.

5. The system of claim 1, wherein the hidden partition includes a media application.

6. The system of claim 5, wherein the visible partition comprises a system restore partition.

7. The system of claim 6, wherein the restore utility is further operable to disassociate the visible partition descriptor from the hidden partition and reassociate the visible partition descriptor with the system restore partition.

8. The system of claim 1, further comprising an application loader operably associated with a master boot record of the storage device, the application loader operable to initiate access to the hidden partition using the visible partition descriptor.

9. A method of restoring a master boot record for a storage device, the method comprising the steps of:
   initiating access to a hidden partition stored within a storage device;
   disassociating a visible partition descriptor from a visible partition of the storage device;
   associating the visible partition descriptor with the hidden partition;
   accessing the hidden partition using the visible partition descriptor;
   initiating a restore utility upon accessing the hidden partition;
   storing a copy of the visible partition descriptor; and
   reassociating the visible partition descriptor with the visible partition while accessing the hidden partition.

10. The method of claim 9, further comprising:
    accessing the stored copy of the visible partition descriptor using the restore utility;
    updating a master boot record to include the stored copy of the visible partition descriptor; and
    maintaining access to the hidden partition upon updating the master boot record.

11. The method of claim 10, further comprising:
    detecting a request to initiate a boot sequence after updating the master boot record;
    initiating the boot sequence using the storage device;
    enabling access to the visible partition using the master boot record; and
    disabling access to the hidden partition.

12. The method of claim 11, further comprising:
    accessing the master boot record to determine an associated visible partition descriptor for the visible partition; and
    loading the visible partition into a memory during the boot sequence.

13. The method of claim 9, further comprising:
    modifying a master boot record of the storage device to associate the visible partition descriptor with the hidden partition; and
    updating the master boot record to reassociate the visible partition descriptor with the visible partition upon accessing the hidden partition.

14. The method of claim 13, further comprising:
    accessing the master boot record to identify a system restore partition descriptor;
    determining an operating state of a utility partition of the storage device;
    determining an availability of a system restore partition associated with the system restore partition descriptor based on the operating state of the utility partition;
    disassociating the system restore partition descriptor from the system restore partition within the master boot record if the operating state is inactive;
    associating the system restore partition descriptor with the hidden partition;
    initiating access to the hidden partition using the system restore partition descriptor; and
    updating the master boot record to reassociate the system restore partition descriptor with the system restore partition.

15. The method of claim 14, further comprising maintaining access to the hidden partition upon updating the master boot record to reassociate the system restore descriptor with the system restore partition.

16. A method of restoring a master boot record of a storage device, the method comprising the steps of:
    initiating access to a hidden partition of a storage device;
    detecting whether a visible partition of the storage device is available;
    accessing a master boot record of the storage device to determine a descriptor for the available visible partition;

storing a copy of the descriptor;
disassociating the descriptor for the available visible partition from the available visible partition within the master boot record;
associating the descriptor with the hidden partition of the storage device;
initiating access to the hidden partition using the descriptor;
verifying access to the hidden partition;
accessing the stored copy of the descriptor; and
modifying the master boot record to reassociate the stored copy of the descriptor with the available visible partition while accessing the hidden partition.

17. The method of claim 16, further comprising:
detecting a new association to a second available visible partition;
updating the stored copy of the descriptor based on the new association; and
accessing the master boot record to include the new association.

18. The method of claim 16, further comprising:
determining an availability of a system restore partition;
disassociating a system restore partition descriptor of the system restore partition from the system restore partition within the master boot record;
storing a copy of the system restore partition descriptor;
associating the system restore partition descriptor with the hidden partition;
accessing the hidden partition using the system restore partition descriptor; and
restoring the system restore partition descriptor of the system restore partition within the maser boot record upon accessing the hidden partition.

* * * * *